United States Patent [19]

Macocs

[11] Patent Number: 5,317,409
[45] Date of Patent: May 31, 1994

[54] PROJECTION TELEVISION WITH LCD PANEL ADAPTATION TO REDUCE MOIRE FRINGES

[75] Inventor: Stephen Macocs, Knoxville, Tenn.

[73] Assignee: North American Philips Corporation, New York, N.Y.

[21] Appl. No.: 801,239

[22] Filed: Dec. 3, 1991

[51] Int. Cl.$^5$ .......................... H04N 5/74; H04N 9/31
[52] U.S. Cl. .................................. 348/751; 359/455; 348/745
[58] Field of Search .................. 358/60, 61, 231, 232, 358/240, 230; 359/455, 456, 460; H04N 5/74, 9/31

[56] References Cited

U.S. PATENT DOCUMENTS

| | | | |
|---|---|---|---|
| 3,938,134 | 2/1976 | Hackstein | 340/324 |
| 4,373,784 | 2/1983 | Nonomura et al. | 350/336 |
| 4,531,812 | 7/1985 | Oguino | 350/128 |
| 4,544,946 | 10/1985 | Van Breemen | 358/231 |
| 4,778,257 | 10/1988 | Takamatsu | 350/333 |
| 4,811,003 | 3/1989 | Strathman | 340/701 |
| 4,908,609 | 3/1990 | Stroomer | 340/702 |
| 5,071,224 | 12/1991 | Yokoo | 359/455 |
| 5,115,305 | 5/1992 | Baur et al. | 358/60 |
| 5,146,342 | 9/1992 | Yokoo et al. | 358/231 |
| 5,146,356 | 9/1992 | Carlson | |

FOREIGN PATENT DOCUMENTS

| | | |
|---|---|---|
| 0302653 | 2/1989 | European Pat. Off. |
| 3420549 | 5/1984 | Fed. Rep. of Germany |
| 59-135427 | 3/1984 | Japan |
| 61-254928 | 11/1986 | Japan |
| 61-282823 | 12/1986 | Japan |
| 62-237428 | 10/1987 | Japan |
| 63-142330 | 6/1988 | Japan |
| 63-271203 | 11/1988 | Japan |
| 1-79728 | 3/1989 | Japan |
| 63-276647 | 5/1990 | Japan |
| 2-158725 | 6/1990 | Japan |
| 63-314496 | 6/1990 | Japan |
| 64-32721 | 8/1990 | Japan |
| 8601063 | 11/1987 | Netherlands |
| 2102175 | 1/1983 | United Kingdom |

Primary Examiner—Stephen Brinich
Attorney, Agent, or Firm—Anne E. Barschall

[57] ABSTRACT

A diagonally oriented LCD panel is used in a rear screen LCD projection television to reduce moiré fringes on the display.

8 Claims, 2 Drawing Sheets

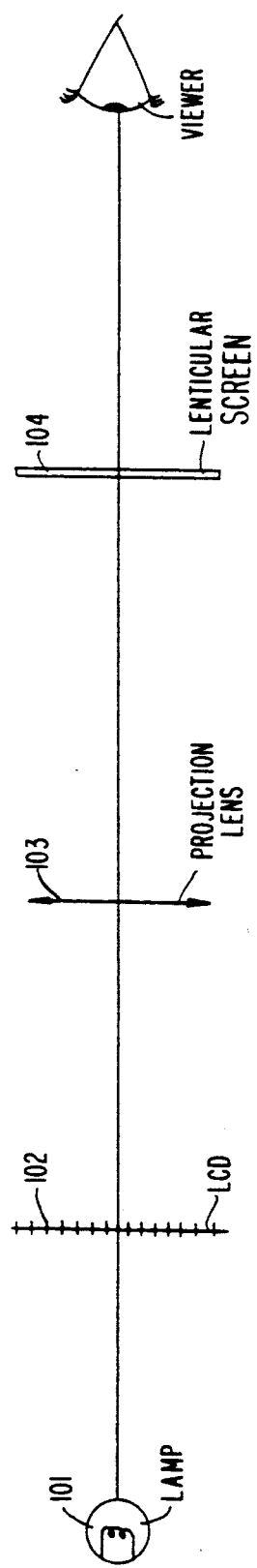
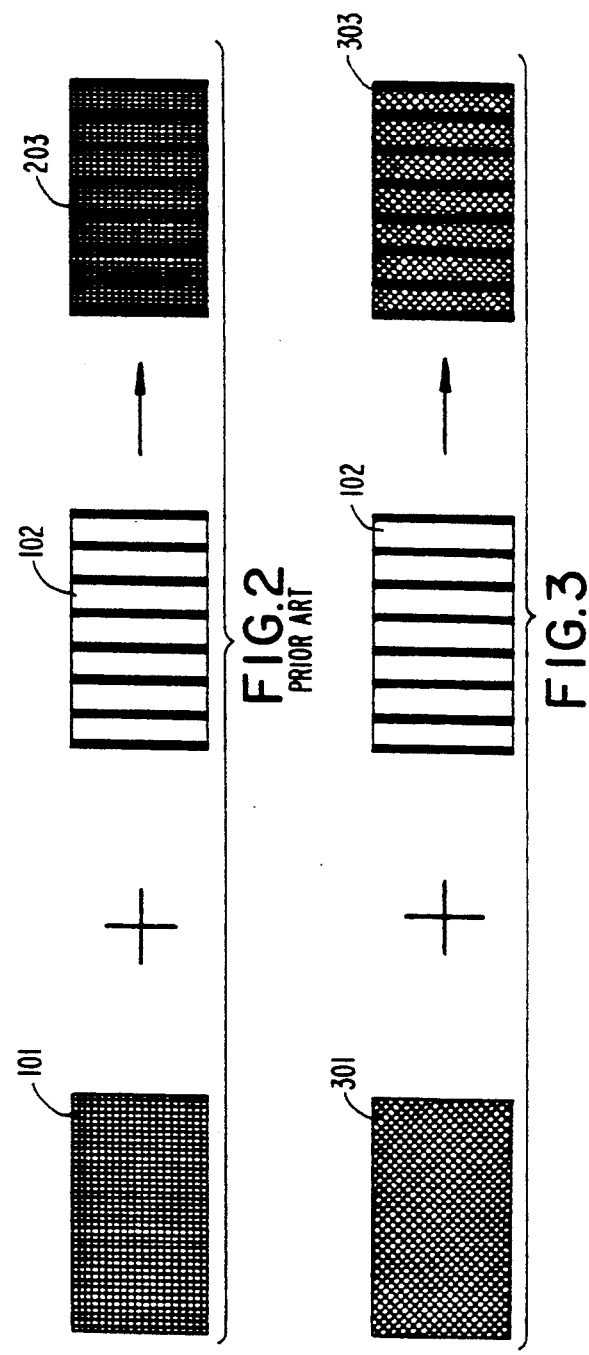

PROJECTION TELEVISION WITH LCD PANEL ADAPTATION TO REDUCE MOIRE FRINGES

BACKGROUND OF THE INVENTION

Field of the Invention

The present invention relates to the field of rear screen LCD projection television.

Related Art

The conventional rear screen LCD projection television is illustrated in FIG. 1. In this system a lamp 101 radiates onto an LCD panel 102. The LCD panel 102 is controlled to selectively block light from the lamp in patterns which create a television picture. Light passing through the LCD panel 102 then passes through a lens 103 to be focused on a lenticular screen 104. The lenticular screen 104 is made up of vertical lenticulars separated by vertical black stripes. The stripes are added to increase contrast.

This conventional system gives rise to moiré fringes on the lenticular screen due to beating between vertical light patterns caused by the vertical interpixel regions on the LCD panel and the vertical stripes on the lenticular screen. As shown in FIG. 2, this effectively multiplies the apparent width of the vertical stripes as shown at 203. Where a Fresnel lens is used to brighten the display, vertical patterns on the Fresnel lens can worsen the moiré effect on the lenticular screen.

Numerous kinds of LCD panels have been used in conventional LCD televisions and in certain kinds of projection systems. For instance, in Japanese Kokai 1-79728 and in co-pending application Ser. No. 07/650,147 filed Feb. 4, 1991, a system with diamond shaped LCD elements is proposed for use in a non-projection LCD television. In German patent document DE 3420549 C1, diagonal LCD elements are used in a projection oscilloscope to create a display in which diagonal portions of letters and oscilloscope traces are approximated by the diagonal LCD elements.

SUMMARY OF THE INVENTION

The object of the invention is to reduce moiré interference in a rear screen LCD projection television.

The object of the invention is achieved by using an LCD panel having a plurality of addressable pixels which are addressed according to a plurality of scan lines. The LCD panel is connected to the lenticular screen by an optical path, and the panel is oriented so that none of the interpixel regions produces a light pattern which, when incident on the lenticular screen, is parallel to lenticulars of a lenticular screen.

BRIEF DESCRIPTION OF THE DRAWING

The invention will now be described by way of non-limitative example with reference to the following drawings.

FIG. 1 shows a conventional LCD projection television.

FIG. 2 shows how the moiré fringes arise in this conventional television.

FIG. 3 shows how a diagonally oriented LCD matrix reduces moiré fringes.

DETAILED DESCRIPTION OF THE PREFERRED EMBODIMENTS

Figure 4:
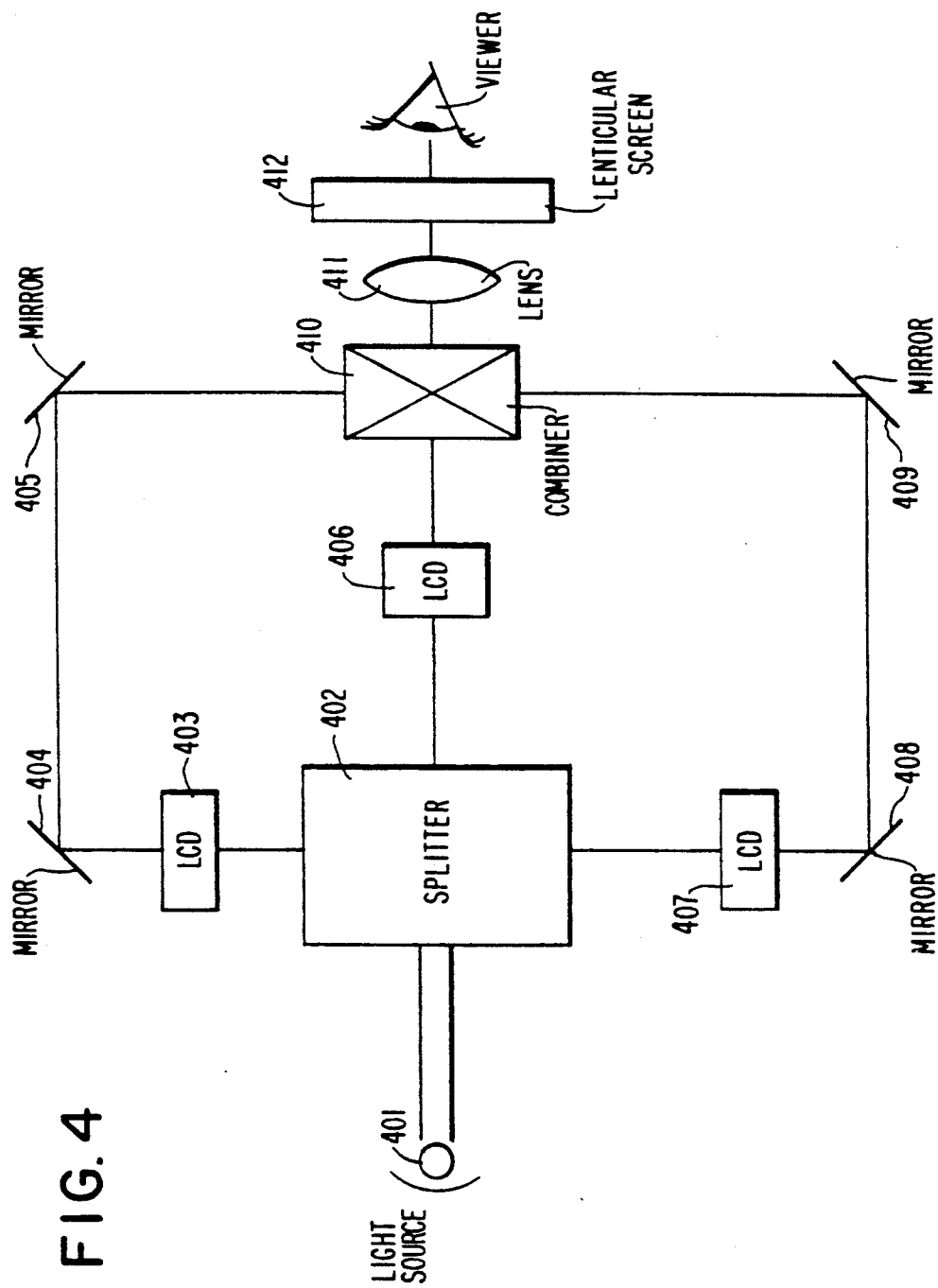
FIG. 4 shows a rear screen LCD projection TV system which has three LCD panels.

As shown in FIG. 3, in the television according to the invention, a diagonally oriented LCD panel 301 is used in place of the vertically oriented LCD panel 102. The screen 301 may be according to Kokai 1-79728. The diagonally oriented panel 301 has LCD pixels which are diamond-shaped, i.e. squares which are rotated 45° from the vertical, and interpixel regions which are diagonal. In this embodiment diagonal is 45° from the vertical. 45° gives minimum moiré interference. Other angles may be used, but moiré will increase as the angle gets farther from 45°. As will be apparent to those of ordinary skill in the art, the LCD pixels may have other shapes so long as the light patterns due to the interpixel regions, when incident on the lenticular screen, are not parallel to the lenticulars.

FIG. 4 shows an alternate embodiment of a television according to the invention. In this embodiment, light from the lamp 401 is split in the splitter 402 into three separate beams, one for each of the three colors red, green and blue. The three beams are incident on three LCD panels 404, 406, and 407, each of the three LCD panels being controlled according to the component of the respective color in the picture to be displayed. Light from the LCD panels 403 and 407 is routed using mirrors 404, 405, 408, and 409 to beam combining element 410. Light from LCD panel 406 is naturally incident on beam combining element 410. The three beams are then combined in the beam combining element 410. The resultant beam is focused by lens 411 onto lenticular screen 412 for display.

In this embodiment, each LCD panel's pixels are oriented diagonally, so that none of the LCD's interpixel regions introduce moiré interference at the lenticular screen 412. While those of ordinary skill in the art might devise any number of light paths for use in such a television, the moiré patterns will be reduced so long as the light patterns resulting from the interpixel regions, when incident on the lenticular screen, are not parallel to the lenticulars.

I claim:

1. A rear screen LCD projection television comprising
    a lenticular screen having a plurality of lenticulars;
    an LCD panel including a plurality of addressable pixels, which pixels are addressed according to a plurality of scan lines; and
    an optical path connecting the LCD panel to the lenticular screen, the path being such that the scan lines, when incident on the lenticular screen, are perpendicular to the lenticulars; characterised in that
    the pixels of the LCD panel are shaped so that no interpixel region produces a light pattern which, when incident on the lenticular screen, is parallel to the lenticulars, whereby moiré fringes on the lenticular screen are reduced.

2. The television of claim 1 comprising
    a lamp for radiating light onto the LCD panel, which is disposed to selectively interrupt light from the lamp according to received television signals; and
    a projection lens, disposed to focus light received from the LCD panel onto the lenticular screen.

3. The television of claim 1 wherein
    the lenticulars are vertical and separated by black stripes for contrast; and the LCD panel comprises diagonal interpixel regions.

4. The television of claim 3 wherein the LCD pixels are diamond shaped and the interpixel regions are at 45° from the vertical.

5. The television of claim 1 comprising three LCD panels, a respective one for each of three colors.

6. The television of claim 5 wherein the lenticulars are vertical and each LCD panel comprises respective diagonal interpixel regions.

7. The television of claim 6 wherein the LCD pixels are diamond shaped and the interpixel regions are at 45° from the vertical.

8. The television of claim 5 comprising
a lamp;
a splitter for splitting light from the lamp into three separate beams incident on the three LCD panels;
means for combining light from the three LCD panels; and
the lenticular screen displaying light combined by the means for combining.

* * * * *

UNITED STATES PATENT AND TRADEMARK OFFICE
CERTIFICATE OF CORRECTION

PATENT NO. : 5,317,409

DATED : May 31, 1994

INVENTOR(S) : Stephen Magocs

It is certified that error appears in the above-identified patent and that said Letters Patent is hereby corrected as shown below:

Cover Page, line after "United States Patent (19) change "Macocs" to --Magocs--.

(75) Inventor:, change "Macocs" to --Magocs--.

Signed and Sealed this

Seventh Day of February, 1995

Attest:

BRUCE LEHMAN

Attesting Officer

Commissioner of Patents and Trademarks